United States Patent
Wu

(10) Patent No.: US 10,839,242 B1
(45) Date of Patent: Nov. 17, 2020

(54) SINGLE-CHIP SOLUTION WITH SMART RECOGNITION BY FEATURE EXTRACTION OF EMBEDDED IMAGE SENSOR

(71) Applicant: Raymond Wu, Taipei (TW)

(72) Inventor: Raymond Wu, Taipei (TW)

(*) Notice: Subject to any disclaimer, the term of this patent is extended or adjusted under 35 U.S.C. 154(b) by 0 days.

(21) Appl. No.: 16/680,662

(22) Filed: Nov. 12, 2019

(51) Int. Cl.
| | |
|---|---|
| G06K 9/20 | (2006.01) |
| G06K 9/42 | (2006.01) |
| G06K 9/62 | (2006.01) |
| H04N 5/235 | (2006.01) |
| G06T 7/231 | (2017.01) |

(52) U.S. Cl.
CPC .............. G06K 9/209 (2013.01); G06K 9/42 (2013.01); G06K 9/627 (2013.01); G06T 7/231 (2017.01); H04N 5/2353 (2013.01); *G06T 2207/20021* (2013.01)

(58) Field of Classification Search
CPC .......... G06K 9/209; G06K 9/42; G06K 9/627; G06T 7/231; G06T 2207/20021; H04N 5/2353
USPC ...................................................... 348/222.1
See application file for complete search history.

(56) References Cited

U.S. PATENT DOCUMENTS

| | | | | |
|---|---|---|---|---|
| 6,292,575 B1* | 9/2001 | Bortolussi | .......... | G06K 9/00234 382/107 |
| 6,493,041 B1* | 12/2002 | Hanko | .................. | H04N 5/144 348/169 |
| 10,664,722 B1* | 5/2020 | Sharma | .............. | G06Q 30/0641 |
| 2014/0118257 A1* | 5/2014 | Baldwin | ................. | G06F 3/017 345/158 |
| 2014/0340570 A1* | 11/2014 | Meyers | ................ | H04N 5/2256 348/370 |
| 2019/0156516 A1* | 5/2019 | Nikkanen | ............ | H04N 5/2355 |
| 2019/0266418 A1* | 8/2019 | Xu | ...................... | G06K 9/00798 |
| 2019/0272625 A1* | 9/2019 | Lim | ...................... | G06K 9/6267 |
| 2019/0286153 A1* | 9/2019 | Rankawat | ................ | G06T 7/11 |
| 2019/0392242 A1* | 12/2019 | Tariq | ................. | G06K 9/00805 |
| 2020/0005468 A1* | 1/2020 | Paul | ...................... | G06K 9/6274 |
| 2020/0090322 A1* | 3/2020 | Seo | .......................... | G06N 3/04 |
| 2020/0265569 A1* | 8/2020 | Lee | ....................... | G06F 3/0482 |
| 2020/0293064 A1* | 9/2020 | Wu | ...................... | G06K 9/00805 |

* cited by examiner

*Primary Examiner* — Pritham D Prabhakher
(74) *Attorney, Agent, or Firm* — Rosenberg, Klein & Lee

(57) ABSTRACT

A single-chip solution with smart recognition by feature extraction of embedded image sensor, which provides an image sensor that performs image recognition. The chip combines an image sensor, an image preprocessor, a motion detector, a scaler array, a feature extractor, a microcontroller, and memory onto a single silicon die. Only required external non-passive component is a serial flash storage device. The motion module detects object in motion. The data is fed back to sensor for optimal exposure on object in motion. The array of image scalers crops areas of interest from input. Cropped images are extracted by the HOG feature extractor into feature vectors. Feature vectors are compared against pre-trained for image recognition, or used to train the system to recognize new images. And the microcontroller can take the classifier result and perform application-specific tasks with it to become a smart application providing excellent progressive and economic value.

6 Claims, 2 Drawing Sheets

SINGLE-CHIP SOLUTION WITH SMART RECOGNITION BY FEATURE EXTRACTION OF EMBEDDED IMAGE SENSOR

CROSS REFERENCES TO RELATED APPLICATIONS

N/A

FIELD OF INVENTION

The invent relates to the general field of single chip solution with embedded image sensing, and has certain specific application to image recognition.

BACKGROUND

Current Artificial Intelligence industry offerings in the image recognition field have for many years concentrated on processing in high-performance cloud platforms. Also, they are widely applied for the voice assistance application. However, this comes not only at a cost of bandwidth but also lag of response time. There are only limited enterprises adopt the resource but common usage. Therefore, there has been a shift toward edge compute. Edge compute offloads some bandwidth and processing to the end-user device, but end-user products are cost-sensitive. For simple or general purposes recognition and prediction. Our method enabled cost-effect edge compute for image recognition, which increases the usage in life and creates more smart application and devices without internet connection.

SUMMARY

The present invention provides a Single-Chip solution with smart recognition by feature extraction of embedded image sensor. It combines a small image sensor, together with digital logic and microcontroller, to provide image recognition capability onto a single silicon die for edge-computer applications. The only required external non-passive component is a serial flash storage device. No external DRAM or SRAM required.

By manufacturing the image sensor plus image preprocessor and recognition circuits onto a single silicon die, we lower the cost of the product.

The image recognition process starts with the image sensor. In this invention, it is just B&W (grayscale).

The sensor image output goes to an image preprocessor. It is responsible for cleanup and scaling.

The preprocessor output goes to a motion detector. It finds motion by dividing the image into bins and comparing it against the previous image. Motion is considered to exist in a specific bin if the difference from previous image is over a programmable threshold. The motion detector can specify motion in a bitmap grid or top/left/bottom/right rectangle coordinates.

The motion coordinate is also used for local exposure control. It comprises a feedback loop from the image sensor, to the motion detector, to the local contrast/brightness average module, read by the microcontroller, which then programs the sensor exposure control, or to use the automatic exposure function of the image sensor. This helps optimize sensor exposure on the object in motion.

The aforementioned preprocessor output is also pumped in parallel to an array of image scalers. These are independently programmed with various areas of interest (AOI) to scale down to a smaller size.

The smaller scaled images are then sent to a Histogram-Of-Gradients (HOG) module to extract image features. The result is a feature vector, which can be used for image recognition.

The image recognition process is performed by the microcontroller using a variety of existing techniques such as KNN and SVM against a database, which is stored in the external serial flash when system is powered off.

Not only can this system perform image recognition against a pre-trained database. It can be trained in the field by the user, such as pedestrian detection, facial recognition, tracking, smart toy, and smart indoor/outdoor electronics, by extracting the feature vector from HOG module, and then store it to the external serial flash.

DETAILED DESCRIPTION AND PREFERRED EMBODIMENT

Figure 1:
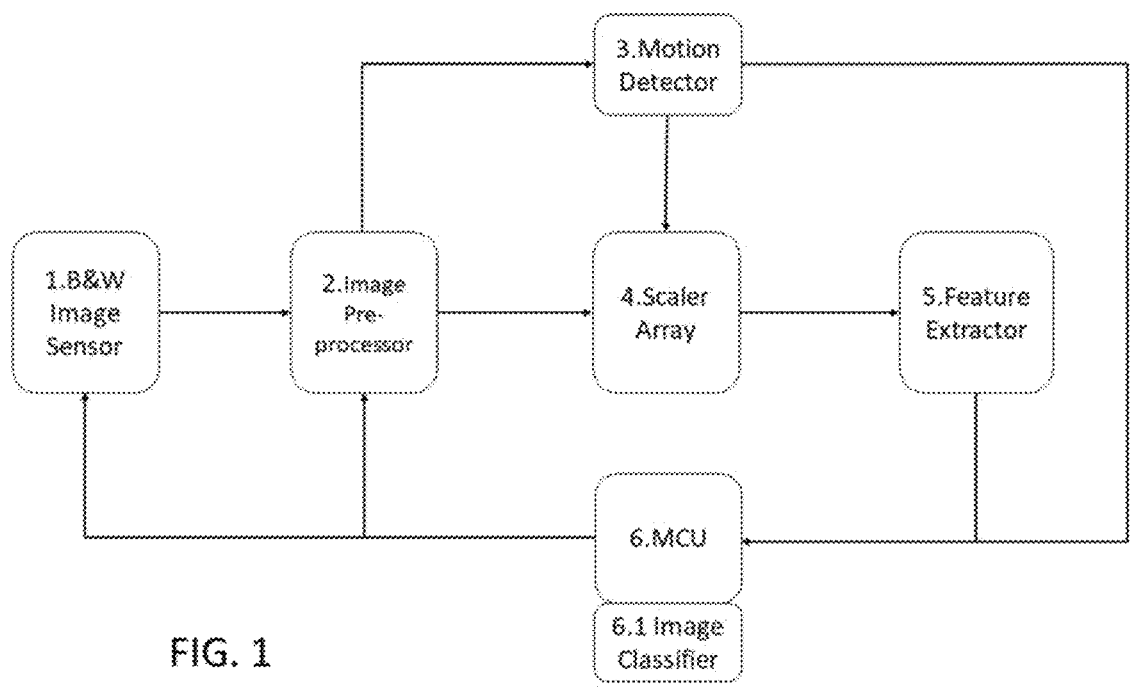
FIG. 1 illustrates a conceptual data flow for image recognition of the present invention.
Figure 2:
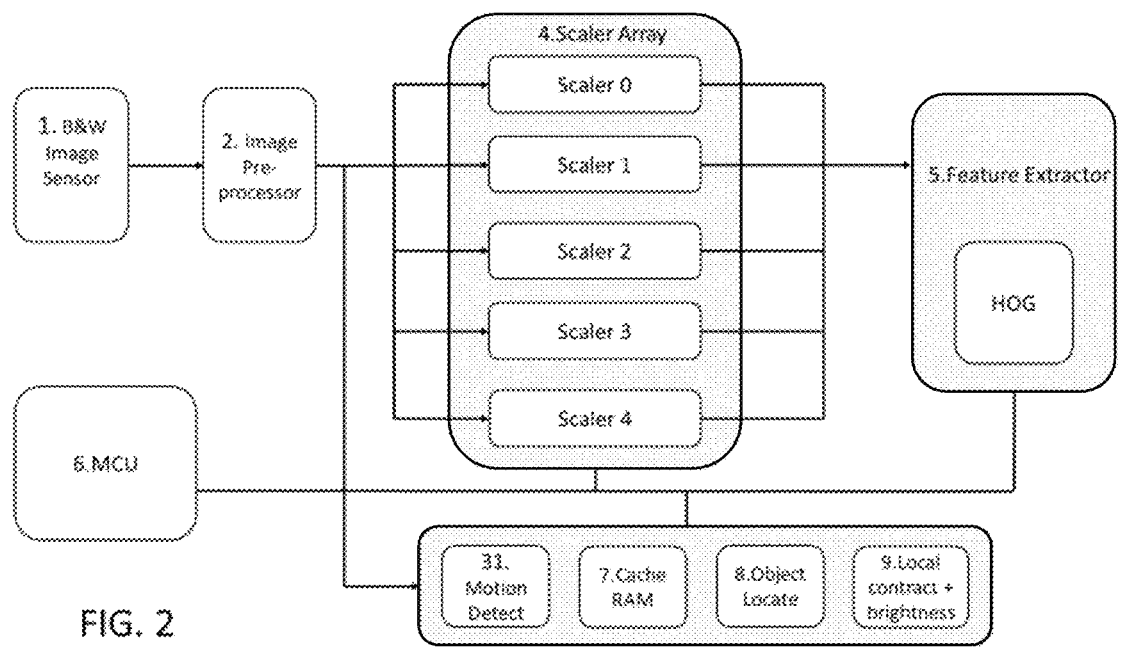
FIG. 2 shows a detailed structure of image processing and feature extraction of the present invention.

Referring to FIGS. 1 and 2, this invention relates to a single-chip sensor with feature extraction, which includes a B&W image sensor 1, an image preprocessor 2, a motion detector 3, a scaler array 4, a feature extractor 5, and a microcontroller 6. The image recognition process starts with the image sensor 1. In this invention, it is B&W (grayscale). The sensor image output goes to the image preprocessor 2, which is responsible for cleanup and scaling. Then, the image output goes to the motion detector 3, and the scaler array 4 respectively.

Figure 3:
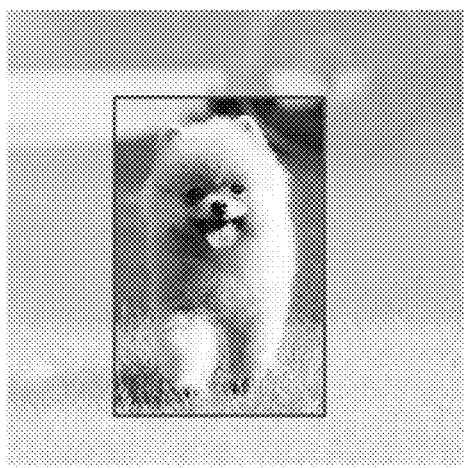
FIG. 3 illustrates a result of localized exposure control.
Figure 4:
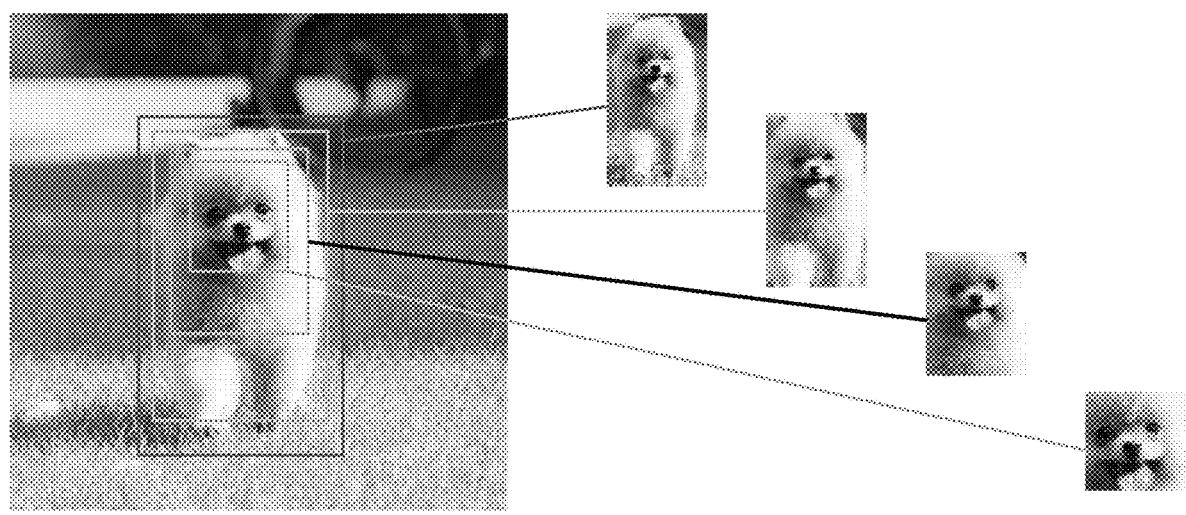
FIG. 4 illustrates concept of scaler array on various AOI.

The motion detector 3 finds motion by dividing the image into bins and comparing it against the previous image. Motion is considered to exist in a specific bin if the difference from previous image is over a programmable threshold. The motion detector can specify motion in a bitmap grid or top/left/bottom/right rectangle coordinates. The motion coordinate is also used for local exposure control. It comprises a feedback loop from the image sensor 1, to the motion detector 3, to the local contrast/brightness average module, read by the microcontroller 6, which then programs the sensor exposure control, or to use the automatic exposure function of the image sensor 1. This helps optimize sensor exposure on the object in motion, such as shown in FIG. 3.

The sensor image feeds into both scaler array 4 and support logic blocks including functions of motion detect 31, cache RAM 7, object locate 8, and local contract/brightness 9. The microcontroller 6 obtains coordinate and brightness/contract of object in motion from support logic block. This information is used to program the image sensor 1 to optimize exposure on object in motion.

The aforementioned preprocessor 2 output is also pumped in parallel to the scaler array 4. These are independently programmed with various areas of interest (AOI) to scale down to a smaller size. The image is programmed to crop and scale various areas in the image. The HOG feature extractor 5 works on 8×8 pixel blocks. The microcontroller 6 will program the extractor 5 divide up the scaled images (from scaler array 4) into 8×8 blocks. The extractor 5 will return a small array of numbers for each block. The microcontroller 6 will take these small arrays from the extraction result, organize them into a vector, which will be a string of numbers based on certain distinguishing features of an image, and then feed them into its image classifier 6.1. The output of the classifier network is the image class that can be compared with the database in serial flash, and is the end result of the image recognition process. It is understood that the database of the serial flash can be replaced and trained by the user.

The supervising FW in the microcontroller 6 will then take the classifier result and perform application-specific tasks with it, such as to specify a feedback action or to play a sound file, and more specifically, for example, lighting one or several LEDs, playing a pre-recorded song, turning a motor, reporting the coordinate signal, waking up a switch, or toggling a GPIO. Therefore, it is easy to apply the switch control combined with the general toy or indoor/outdoor electronic equipment to form a smart application that can quickly identify images without network connection. In conclusion, the present invention has excellent progressive and economic value.

In summary, this invention has the following effects:
1. To convert multiple components into single chip and reduce integrate effort and risk. It is a worldwide first AI chip with sensor inside.
2. To provide efficiency required computing on hardware for speedy response requirement. This is quite different from traditional AI which applied huge data computing in software that cause power and time consuming.
3. Including smart feature extraction algorism with limited memory size required during operation and flexible recognition objects replacement by programmable software control according to any specific purpose.
4. No image reversal possibility in end user with privacy protection.

What is claimed is:

1. A single-chip sensor with feature extraction containing a B&W (grayscale) image sensor, an image preprocessor, a motion detector, a scaler array, a feature extractor, and a microcontroller, wherein
    a) the image sensor captures an image output going to the image preprocessor, the image preprocessor cleanups and scales the image, and then feeds to the motion detector, and the scaler array respectively,
    b) the motion detector finds motion by dividing the image into bins and comparing it against a previous image in use of support logic blocks including functions of motion detect, cache RAM, object locate, and local contract/brightness,
    c) the scaler array programs to crop and scale various areas in the images, which are independently programmed with various areas of interest (AOI) to scale down to a smaller size and passing to the feature extractor,
    d) the feature extractor divides up scaled images from the scaler array into blocks and returns a small array of numbers for each block, and
    e) the microcontroller takes small arrays from the extraction result to organize them into a vector and then to feed them into an image classifier, which outputs an image class that can be compared with a database in an external serial flash, and completes an image recognition process.

2. The single-chip sensor with feature extraction as in claim 1, wherein the image recognition process starts with the image sensor being B&W (grayscale).

3. The single-chip sensor with feature extraction as in claim 1, wherein the motion detector specifies motion in a bitmap grid or top/left/bottom/right rectangle coordinates being also used for local exposure control to comprise a feedback loop from the image sensor to the motion detector, to a local contrast/brightness average module, and read by the microcontroller, which then programs a sensor exposure control.

4. The single-chip sensor with feature extraction as in claim 1, wherein the microcontroller takes a classifier result and performs application-specific tasks with it, such as to specify a feedback action or to play a sound file.

5. The single-chip sensor with feature extraction as in claim 4, wherein the application-specific tasks include lighting one or several LEDs, playing a prerecorded song, turning a motor, reporting the coordinate signal, waking up a switch, or toggling a GPIO (general-purpose input/output).

6. The single-chip sensor with feature extraction as in claim 1, wherein the database of the external serial flash is replaceable.

* * * * *